April 2, 1968    F. WATERTON    3,375,572

WELDING METHOD FOR CONSTRUCTING AN ENVELOPE

Filed Aug. 18, 1964

3,375,572
WELDING METHOD FOR CONSTRUCTING
AN ENVELOPE
Frank Waterton, Potters Bar, England, assignor to Associated Electrical Industries Limited, London, England, a British company
Filed Aug. 18, 1964, Ser. No. 390,351
Claims priority, application Great Britain,
Aug. 19, 1963, 32,716/63
3 Claims. (Cl. 29—482)

The present invention relates to methods of welding together two metal members and more particularly to the preparation of the two members before the actual welding operation takes place.

The invention has a particular application in the welding of a flat end plate on to a cylindrical body member in the manufacture of high vacuum vessels. The metal used may contain defects which, although minute in size and not significant by ordinary engineering standards, nevertheless in a high vacuum vessel constitute a leak hazard which is difficult to detect until the vessel has been sealed or subjected to baking at a high temperature in order to degas the metal. As is well known, plate material has a grain structure caused by the manufacturing process, the grain running parallel to the flat faces of the plate. The defects referred to above are most noticeable and are most likely to result in leaks when two parts of the end grain of the metal are exposed respectively to the atmosphere and to the vacuum.

The thickness of the plate is normally made large in order to withstand the forces exerted on it due to the pressure difference between the surfaces of the plate. If the end plate is thick it cannot easily be welded directly on to the thinner body member but has first to be prepared. The end plate is commonly prepared for welding to the cylindrical body member by machining a groove in the outer surface of the plate adjacent to its peripheral edge so tha the ring of metal between the outer side of the groove and the periphery of the plate forms a lip. When the end plate is inserted in the associated end of the cylindrical body member this lip extends longitudinally relative to the body member and the end plate is welded to the body member by forming a weld between the edge of the lip and the edge of the body member. Such a weld is conveniently formed by an automatic welding process or by unskilled labor.

By preparing the end plate in this manner two parts of the end grain of the material are exposed respectively to the atmosphere over the surface of the groove and to the vacuum over the periphery of the plate, and as indicated above this is liable to result in leaks being formed through the material.

An object of the present invention is to provide an improved method of construction for an envelope adapted to operate with an internal vacuum which reduces or eliminates end grain leakage.

According to the present invention a method of construction of an envelope adapted to operate with an internal vacuum and which includes as part of the envelope a metal plate having first and second opposite faces, includes the steps of preparing the metal plate by removal of material from the first face only thereof to form a radially extending relatively thin annular part of the plate, bending this thin annular part of the plate towards or away from the first face to extend as a flange normally or substantially normally of the plate, assembling the plate to the remainder of the envelope so that one face of the plate is directed towards the inner or vacuum side of the enclosure, and securing the flange to adjacent parts of the enclosure by welds arranged to seal the end grain of the flange.

The invention will now be described, by way of example, with reference to the accompanying drawings, in which.

Figure 1:
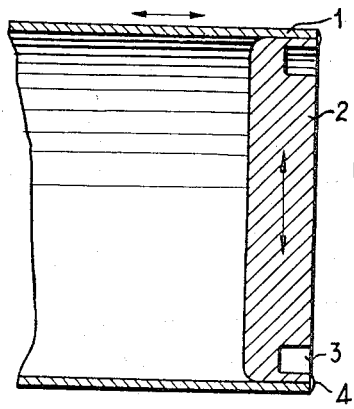
FIGURE 1 is a sectional side elevation of one end of a high vacuum vessel in which an end closure plate is welded in position using a known method.

Referring first to FIGURE 1, the high vacuum vessel comprises a cylindrical body member 1 having a thin wall, and a circular flat end plate 2 which has a large thickness in order to withstand the forces exerted on it when the vessel is evacuated. It will be appreciated that the vacuum vessel will be closed with a second end plate at its other end, or some alternative closure means.

A groove 3 is formed in the outer surface of end plate 2 and the outer edge of the groove is spaced a short distance from the edge of the plate in order to form a thin lip 4. The end plate is welded to the body member by a weld extending along the edges of the lip 4 and the body member. The vessel can be opened up and resealed a number of times without rebuilding by cutting the weld and reforming the weld along the new edges of the weld and the body member.

The end plate 2 is so formed that the grain of the material runs substantially parallel to the outer surface of the plate as indicated by the arrow. The end grain is therefore exposed to the atmosphere at the sides of the grooves. If the depth of the groove is appreciable, and there are faults in the material, this exposure of the end grain is very liable to cause a leak through the end plate, for the reasons described above.

Figure 2:
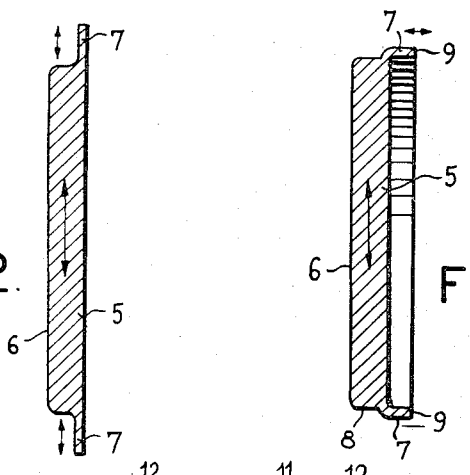
FIGURES 2 and 3 are sectional side elevations of an end closure plate in accordance with the invention and illustrate respectively two stages in the preparation of the plate.
Figure 3:
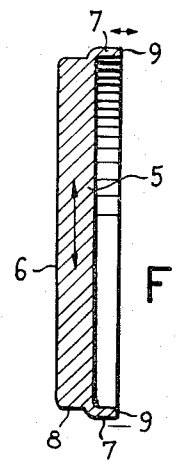
Figure 4:
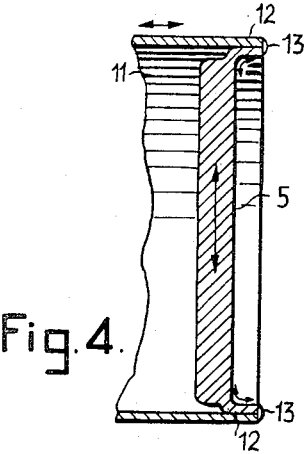
FIGURE 4 is a sectional side elevation of one end of a high vacuum vessel in which the end plate is welded in position in accordance with the present invention.

In order to avoid this disadvantage of the known construction described above, the vacuum vessel is constructed in accordance with the invention as illustrated in FIGURES 2, 3 and 4. FIGURES 2 and 3 illustrate successive stages in the construction of the end plate 5. As illustrated in FIGURE 2, a peripheral zone of one surface 6 of the circular end plate 5 is cut away so as to leave a thin annular portion 7. This annular portion 7 is then bent away from surface 6 by any suitable method, by spinning, forging, or using a press tool for example, so as to form a flange, as illustrated in FIGURE 3, extending round the edge of the end plate. The grain of the material forming the end plate extends substantially parallel to the surface of the end plate, as indicated by the arrows, and since portion 7 is bent to form the flange, the grain continues through the flange parallel to the surface of the flange, as indicated by the arrows. The second and outer surfaces of the end plate 5 is thus uncut. The end grain is therefore exposed only at 8 on the outer circumferential surface of the end plate and at 9 on the edge of the flange portion 7.

The assembly of the end plate and the body member is illustrated in FIGURE 4. The end plate 5 is welded to the cylindrical body member 11 by a weld 13 extending over the edge 8 of the flange portion 7 and the end 12 of the cylindrical body member. The grain in the cylindrical body member also extends parallel to the surface of the body member and the end grain is exposed only at the end 12 of the body member.

Since the cut away surface of end plate 5 is located within the high vacuum vessel, the end grain at 8 will not be exposed to the atmosphere. The end grain at 9 and 12 will be covered by the weld end extends over only a small area. Therefore the risk of a leak occurring due to the exposure of the end grain and to the existence of small faults in the material of the end plate is very much reduced.

If it is desired to open up the vacuum vessel, in order to replace components therein for example, the weld 13 can be cut away together with a small portion of the body member and of flange portion 7. In order to reseal the vacuum vessel another weld can then be formed on the new edges of the body member and flange portion 7 and this process can be repeated if necessary until all the flange portion 7 has been cut away.

Figure 5:
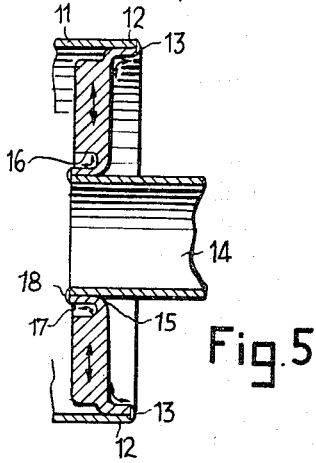
FIGURE 5 is a sectional side elevation of one end of another high vacuum vessel in which the end plate is welded both to the vessel and to a central duct in accordance with the method of the invention.

FIGURE 5 illustrates one end of the high vacuum vessel illustrated in FIGURES 2, 3 and 4 with a tubular member 14 welded within an aperture 15 in end plate 5. Before the welding operation takes place the edges of the aperture 15 are prepared by cutting away from the inner surface of the plate an annular portion 16 which embraces the aperture 15, and bending over the lip so formed to provide a flange 17 extending within the vessel. The grain of the material lies parallel to the outer surface of the end plate 5 and along the flange 17 as indicated by the arrows, so that the end grain is exposed only at the edge of the annular cutaway portion 16 and at the edge of the flange 17. With the arrangement illustrated the end grain is exposed only to the high vacuum in the vessel and not to the atmosphere.

The end of tubular member 14 is secured within aperture 15 by forming a weld 18 joining the edge of the flange 17 and the end of member 14.

An alternative arrangement in which the tubular member 14 extends from within the high vacuum vessel to the end plate 5, the flange 17 is bent outwards so that the outer end of the tubular member is welded to the edge of flange 17.

If desired the thin annular portion 7 can be bent, from the original position shown in FIGURE 2, towards the left of that figure, so that the flange extends towards the side of the plate from which metal was cut away. When this alternative arrangement is used, the advantage is still obtained that the exposed parts of the end grain are all exposed to the vacuum, or alternatively are all exposed to atmosphere, so eliminating the end grain leakage referred to above.

What I claim is:
1. A method of constructing an envelope adapted to operate with a pressure difference between its interior and its exterior including the steps of:
   (a) forming a cylindrical part of the envelope having a relatively thin wall;
   (b) preparing a metal plate by bending an annular peripheral part of the plate to extend as a peripheral flange substantially normal to the plate;
   (c) inserting the metal plate into the cylindrical part of the envelope so that the flange extends outwardly away from the central part of the plate; and
   (d) forming a weld securing the flange to the adjacent part of the thin wall of the cylindrical part of the envelope by a weld which seals the end grain of the flange;

characterized in that:
   (e) the plate is initially much thicker than the said wall;
   (f) before the metal plate is formed with the peripheral flange substantially normal to the plate, material is removed from a first face of the plate to form a radially extending thin annular peripheral part on the plate which is thinner than the said initial thickness of the plate; and
   (g) the thin annular peripheral part of the plate forms the said flange;

whereby when the envelope is used with an internal vacuum, the lakage of air into the envelope through the end grain of the plate is substantially prevented.

2. A method according to claim 1 wherein the said peripheral flange is bent in the direction away from the said first face.

3. A method according to claim 1 wherein the said peripheral flange is bent in a direction towards the said first face.

References Cited

UNITED STATES PATENTS

| | | | |
|---|---|---|---|
| 874,084 | 12/1907 | Jottrand et al. | 29—482 |
| 993,883 | 5/1911 | Schickert | 29—482 |
| 1,494,824 | 5/1924 | Taylor | 29—480 X |
| 2,130,351 | 9/1938 | Langvand. | |
| 2,547,521 | 4/1951 | Buehler | 113—120 X |

FOREIGN PATENTS

| | | |
|---|---|---|
| 1,334,878 | 7/1963 | France. |

JOHN F. CAMPBELL, *Primary Examiner.*

L. J. WESTFALL, R. F. DROPKIN, *Assistant Examiners.*